United States Patent [19]

Summer et al.

[11] Patent Number: 5,467,293

[45] Date of Patent: Nov. 14, 1995

[54] SYSTEM AND METHOD FOR ASSOCIATIVE SOLID SECTIONING DURING DRAFTING OF GEOMETRIC MODELS

[75] Inventors: Randi M. Summer, Long Beach; Dennis Garbanati, Mission Viejo; Patricia L. Winter, Long Beach; Ronald D. Gates, Huntington Beach, all of Calif.

[73] Assignee: Electronic Data Systems Corporation, Plano, Tex.

[21] Appl. No.: 86,680

[22] Filed: Jul. 1, 1993

[51] Int. Cl.⁶ .................. G06F 17/00; G06F 15/60
[52] U.S. Cl. ........................... 364/578; 364/512
[58] Field of Search ........................ 364/578, 512, 364/474.2, 474.24, 560; 395/120, 141; 345/139; 33/431, 432; 346/1.1, 139 C

[56] References Cited

U.S. PATENT DOCUMENTS

| | | | |
|---|---|---|---|
| 3,867,616 | 2/1975 | Korolitz et al. | 364/512 |
| 4,275,449 | 6/1981 | Aish | 395/120 |
| 4,757,461 | 7/1988 | Stohr et al. | 364/512 |
| 4,855,939 | 8/1989 | Fitzgerald, Jr. et al. | 364/512 |
| 4,864,520 | 9/1989 | Setoguchi et al. | 395/120 |
| 4,945,498 | 7/1990 | Mitamura | 395/141 |
| 5,251,290 | 10/1993 | Pabon | 395/120 |
| 5,278,983 | 1/1994 | Kawabe | 395/120 |

Primary Examiner—Ellis B. Ramirez
Attorney, Agent, or Firm—L. Joy Griebenow

[57] ABSTRACT

A system and method for associative solid sectioning during drafting of geometric solid models is shown which automatically generates a section view of a solid model by receiving input from a user including at least one feature the user desires associated with a section line, associating selected edges of the designated feature(s) with corresponding section segments, creating additional section segments if necessary, trimming all of the section segments together to form a section line which is then associated to the solid model. A section view is then created based on the associated section line. Moreover, the section line of the system and method of the present invention automatically tracks an associated feature if such feature should change during editing of the solid model by determining that the feature has changed, automatically adjusting any section segments which cross the changed feature, regenerating the section line from the adjusted section segments, and updating the section based on the regenerated section line.

16 Claims, 8 Drawing Sheets

Microfiche Appendix Included
(58 Microfiche, 5 Pages)

(58 Microfiche, 5 Pages)

SYSTEM AND METHOD FOR ASSOCIATIVE SOLID SECTIONING DURING DRAFTING OF GEOMETRIC MODELS

BACKGROUND OF THE INVENTION

1. Field of the Invention

The present invention relates generally to computer-aided design and engineering, and more particularly to a method and apparatus for improved associative drafting of geometric models.

2. Description of the Related Art

During the drafting process for creating geometric models, a user is called upon to input a great deal of information which a modeling system employs to assist the user in creating geometric models for various CAD/CAM applications. Often the draftsperson is required to mentally determine what a cross-section would look like and then manually create the respective section by drawing unassociated curves on the drawing to generate the correct sections for the drafting system.

Moreover, while some drafting systems aid the draftsperson in creating a section by automatically determining the necessary curves, and establishing the section therefrom, if the model is changed, for example, due to editing or design changes, the draftsperson is required to manually repeat most of the original creative input, taking into account the relevant desired changes, for the system to regenerate a new section. Thus updating the model requires manual intervention for current drafting systems. This results in unnecessary lost work every time a model is updated.

A few drafting systems create cross-sections and receive user input concerning the dimensioning of cross section and model change. Once a change occurs in the model, the section view updates automatically without the actual cross-section cut itself changing its location if it needs to. Thus, if a draftsperson initially creates a section cut through specified entities of an object, and then the draftsperson moves or modifies one of the entities in some fashion, these drafting systems will either show the entity as still present as it previously existed, will indicate the entity is gone if it was moved, or will cut through the entity at an undesirable location. In other words, the section will no longer appropriately reflect the changed entity because current drafting systems do not track geometric entities in connection with an associated section line.

After a section is created a user typically manually places a number of reference dimensions on the section view itself. Though the section will be regenerated (redrawn) if the model changes, those reference dimensions all disappear, thereby resulting in additional lost work as a user is then obliged to manually reinput those dimensions.

Microfiche Appendix

A microfiche appendix of 5 pages or 258 frames contains a program listing demonstrating an embodiment of the present invention.

SUMMARY OF THE INVENTION

In view of the above problems associated with the related art, it is an object of the present invention to provide a system and method which enable a user to track entities as they are moved without having to manually respecify locations and original information beyond the specific change desired.

It is another object of the present invention to provide a system and method for which, after editing of a model, the user is not required to manually correct the section or associated dimensions.

It is a further object of the present invention to provide a system and method which track geometric or topological entities, features or attributes so that when a model is changed, for example at least one feature is repositioned, resized, deleted, or a combination thereof, the affected section line automatically adjusts itself so as to continue to go through the desired features according to standard drafting practices, and that in turn automatically causes the associated section view as well as the associated dimensions to update.

It is yet a further object of the present invention to provide a system and method which saves work for the user in creating a standard drawing from a geometric CAD model and in updating the drawing when the geometric model is changed, without slowing down process of editing the geometric model itself.

In the accomplishment of these and other objects, the present system and method enables a drawing manager of a drafting system to perform associative solid sectioning during drafting of geometric solid models which automatically generates a section view of a solid model. This is accomplished by receiving input from a user including at least one feature the user desires associated with a section line, automatically generating a section line through the designated features and associating it to the edges of those features. A section view is then automatically created based on the associated section line. Moreover, the section line of the system and method of the present invention automatically tracks an associated feature if such feature should change during editing of the solid model by determining that the feature has changed, automatically adjusting any section segments which cross the changed feature, regenerating the section line from the adjusted section segments, and updating the section based on the regenerated section line.

With the present invention once a section is created, the section view will automatically update to reflect changes in the model. Therefore if the model changes, the draftsperson will not need to respecify any dimensions of the section, or tell the system to regenerate the section to include the changes.

These and other features and advantages of the invention will be apparent to those skilled in the art from the following detailed description of preferred embodiments, taken together with the accompanying drawings, in which:

DETAILED DESCRIPTION OF THE PREFERRED EMBODIMENT

Figure 1:
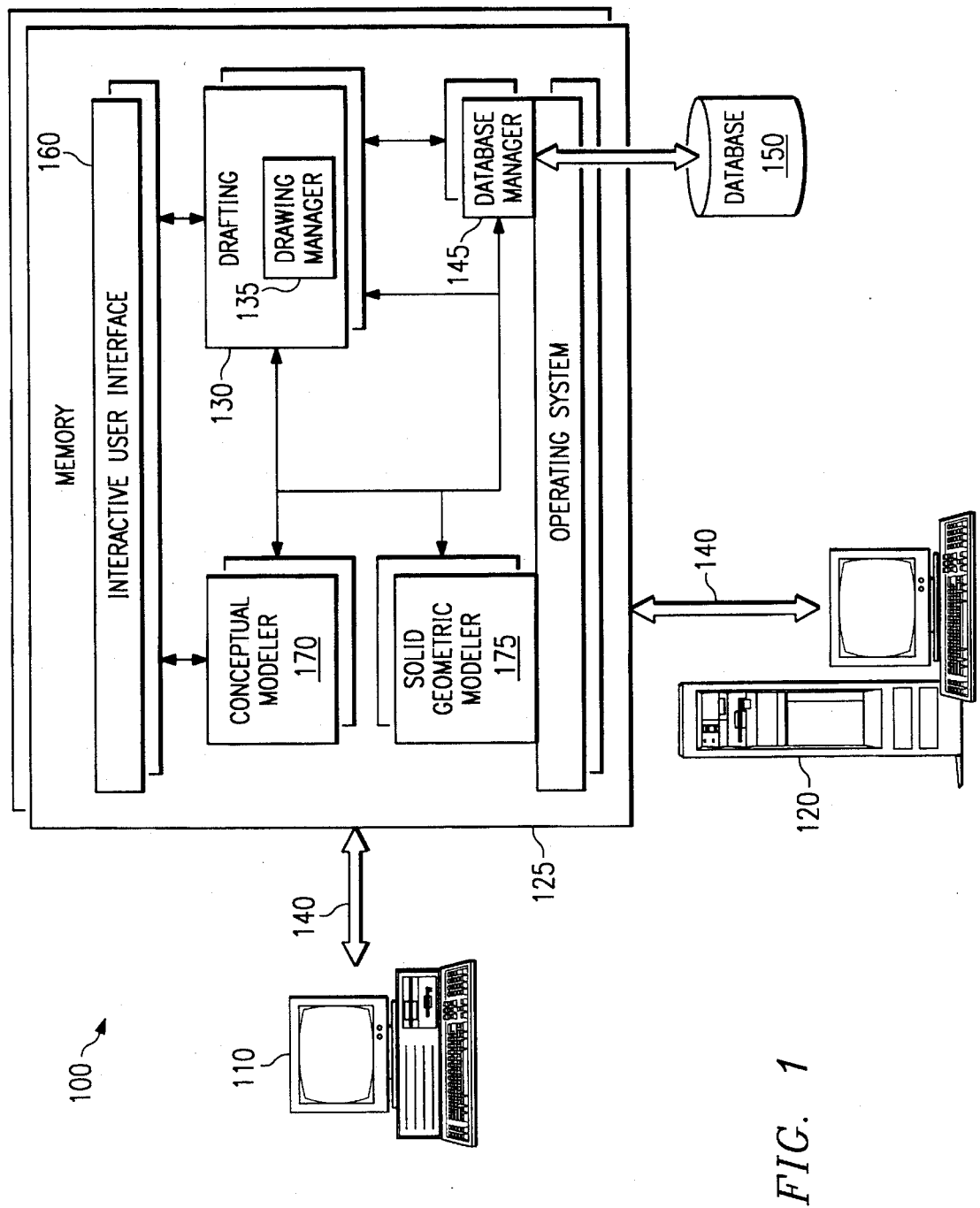
FIG. 1 is a schematic illustration of an example processing system embodying the present invention.

Look first at FIG. 1 which shows a schematic diagram illustrating an example processing system employing the present invention. For the sake of discussion herein, system 100 incorporates at least one workstation or client/server 110 and/or at least one mainframe computer 120. The exact composition of such workstation 110 and mainframe 120 are well-known and will not be described herein. There is a CAD system of the user's choice, such as are well-known in the art, residing on said workstation 110 and/or mainframe 120. Such CAD system includes a drafting system 130 with a drawing manager system 135 and is preferably feature-based, although it could also be attribute-based.

The CAD system directs system 100 to access memory 125 via bus 140 to reach drafting system 130. A part file is retrieved by database manager 145 from database 150 and brought into memory 125. Database 150 preferably contains geometry (feature representation) for solid models. The user interactively (via interface 160) selects desired options and geometries, including hinge line, arrow direction and which features he wants the section to go through, and drawing manager system 135 generates a section view therefrom (further described in detailed later). The drawing manager system 135 uses responses to its queries of conceptual modeler 170 for feature data, solid geometric modeler 175 for modeling information, and database manager 145 for drawing information from database 150, together with input from the user via interactive user interface 160 to generate the section view.

Conceptual or feature modeler 170 keeps track of all of the features of the solid and is built on top of geometric (solid) modeler 175. The current implementation of the present invention employs Parasolid® (registered trademark and product of Electronic Data Systems Corporation) as geometric modeler 175 to obtain the geometric descriptions of the desired model.

Drawing manager system 135 outputs updated information (display of modified drawing and plots) to a display processor which is part of workstation 110 and/or mainframe 120 and interacts with database manager 145 to update database 150.

By way of explanation, a number of interrelated aspects of the system and method of the present invention will now be described. Specifically, a section view is a view that shows an object as if part of it were cut away to expose the inside of the object. The present system and method allows a user to create section views on a drawing which are fully associative with the model. The system prompts the user through the process of creating a section line (described more fully later) situated as desired in relation to the model and then automatically creates a crosshatched section view in proper orthographic projection and at the desired view scale (also described in more detail later).

To add a section view a user preferably chooses a section type, a section view hinge line, and the desired viewing direction, as well as indicating all necessary cut positions and the system automatically generates a section line and a section view therefrom. A hinge line is a line indicating direction to rotate a view in proper orthographic space.

Figure 2:
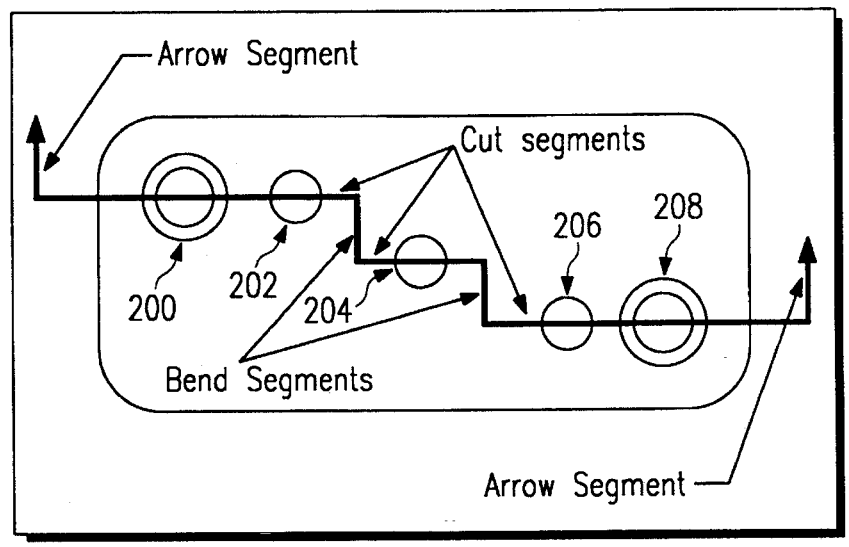
FIG. 2 is a schematic drawing illustrating the components of a section line.

A section line is a line used to define the cutting plane(s) and the viewing direction of a section view. A cutting plane is a theoretical collection of connected surfaces which pass through the model and defines what will be included in the section view. The section line is a type of drafting entity and can be created, stored, edited, blanked, etc. A section line can be edited by adding, moving or deleting segments of the section line. FIG. 2 is a schematic drawing illustrating the components of a section line. The section line is composed of cut, bend, and arrow segments. A cut segment is a portion of a section line that defines a portion of the cutting plane. In FIG. 2 three cut segments are seen going through five features (200,202,204,206,208). An arrow segment is a portion of a section line that includes the arrowhead. The arrow segment defines the direction of sight for viewing the section. Arrow segments are always perpendicular to the cutting plane. Lastly, the bend segment is a portion of a section line that connects the cut segments.

Moreover, a section line can be placed in a view unrelated to existing geometry (e.g. screen position) or it can be positioned through existing entities or features. If a feature is used for section line position definition, the system associates the section line with the feature. This means that if the feature moves, the associated segment of the section line (or a portion of the section line passing through the feature) also moves. The converse is not true however. Furthermore, if a feature is deleted then the segment going through that feature is also deleted.

Figure 3A:
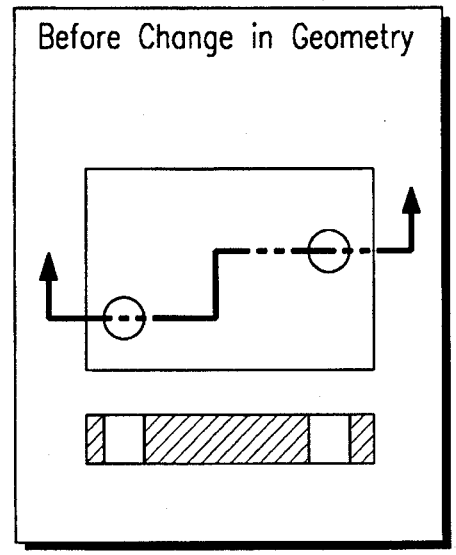
FIGS. 3a–c are schematic drawings of a section of a model illustrating section line-to-feature associativity of the present invention in contrast to comparable drawings from prior systems.
Figure 3B:
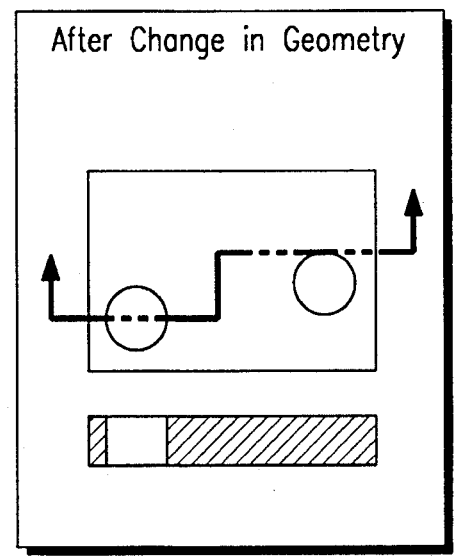
Figure 3C:
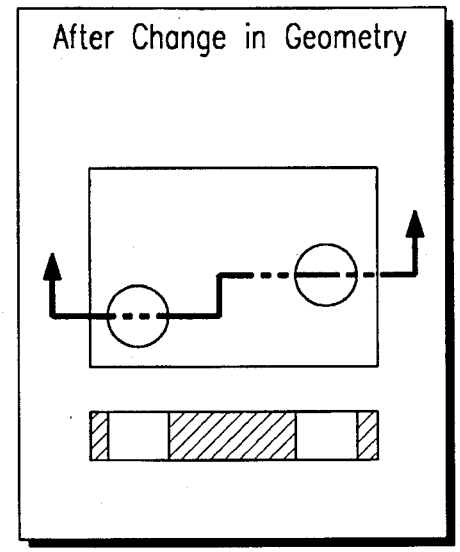

FIGS. 3a–c illustrate section line-to-feature associativity. Specifically, FIG. 3a is a schematic illustration of a section of a solid model and its respective section view before any change in geometry. FIG. 3b is a schematic illustration of the section of the model and its section view as would be generated by current drafting systems after a change in the model's geometry has occurred. FIG. 3c is a schematic illustration of section of the model and its respective section view as would be generated by the present system after the identical change in the model's geometry has occurred in FIG. 3b. The section line was constructed by associating the cut segments of the section line with the arc centers of the two holes. As can be seen, when the two holes in the part are enlarged and relocated, the section line of the present invention accommodates the change and moves with the holes (FIG. 3c).

A section line is associated with the section view created from it. Any changes to the section line cause the section view to regenerate (update) to reflect the changes. In addition, if a user removes a section view from the drawing the section line will also be removed from the parent view.

Returning now to section views, the section view is associated with the model. Any changes to the model will also cause the section view to regenerate to reflect these changes, although this regeneration is preferably delayed so as not to slow down the modeling operation. FIG. 3c illustrates the updated section line and section view after changes to the model have been made.

Figure 4:
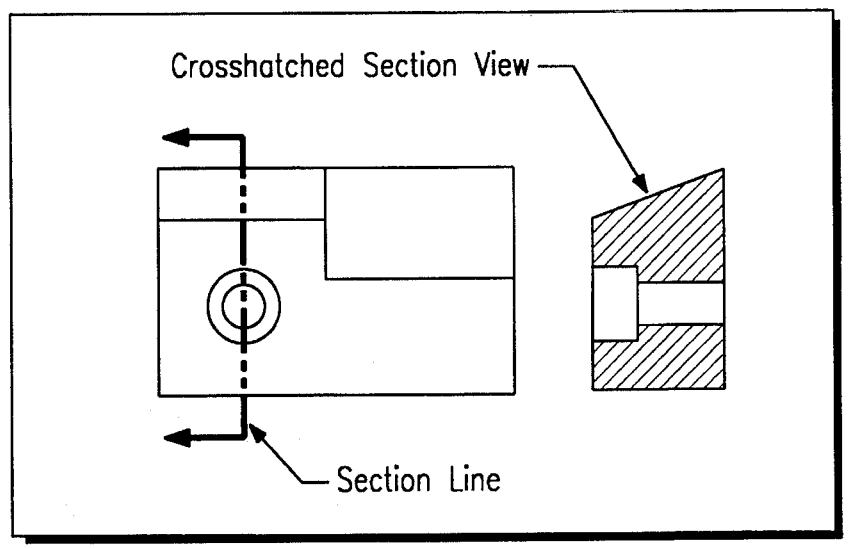
FIG. 4 is a schematic drawing illustrating a simple section view placed on a drawing, including section line and cross-hatching.

There are a variety of section view types available to a user including, for example, simple, stepped, revolved, half sections (described below). When a user adds a section view to a drawing the system projects the section view orthogonally and parallel to the hinge line. FIG. 4 is a schematic drawing illustrating how a simple section view is placed on the drawing in this manner, including section line and crosshatching. A simple section is a section view created by dividing a model with a single cutting plane. After initially placing the section view on the drawing, a user may subsequently move the view to a new location. Even though the section view may be moved out of projection it will still maintain associativity to the parent view as explained more fully later.

Figure 5:
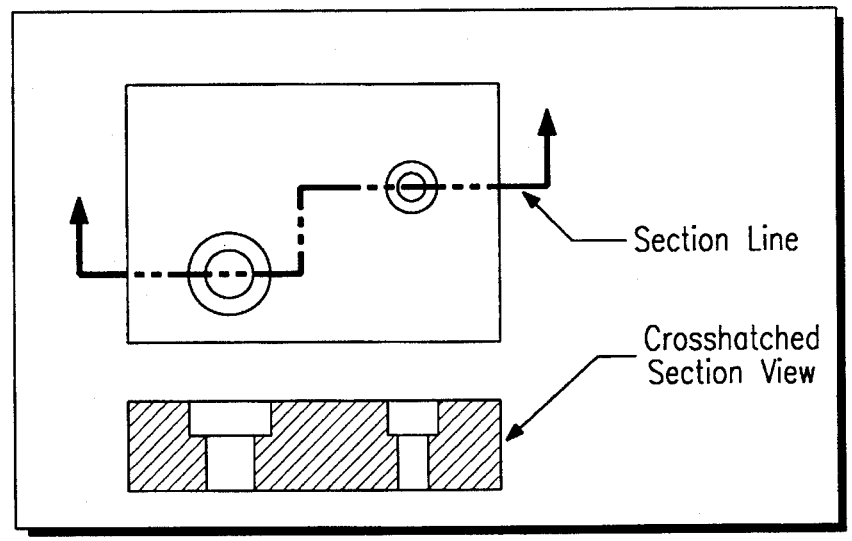
FIG. 5 is a schematic drawing of a section of a model illustrating a completed stepped section view.

A stepped section is a section view which contains linear steps and includes geometry in the section view which would otherwise not be included if only a simple section line was used. FIG. 5 is a schematic drawing of a model section and its respective stepped section view with crosshatching for the shown section line.

Figure 6:
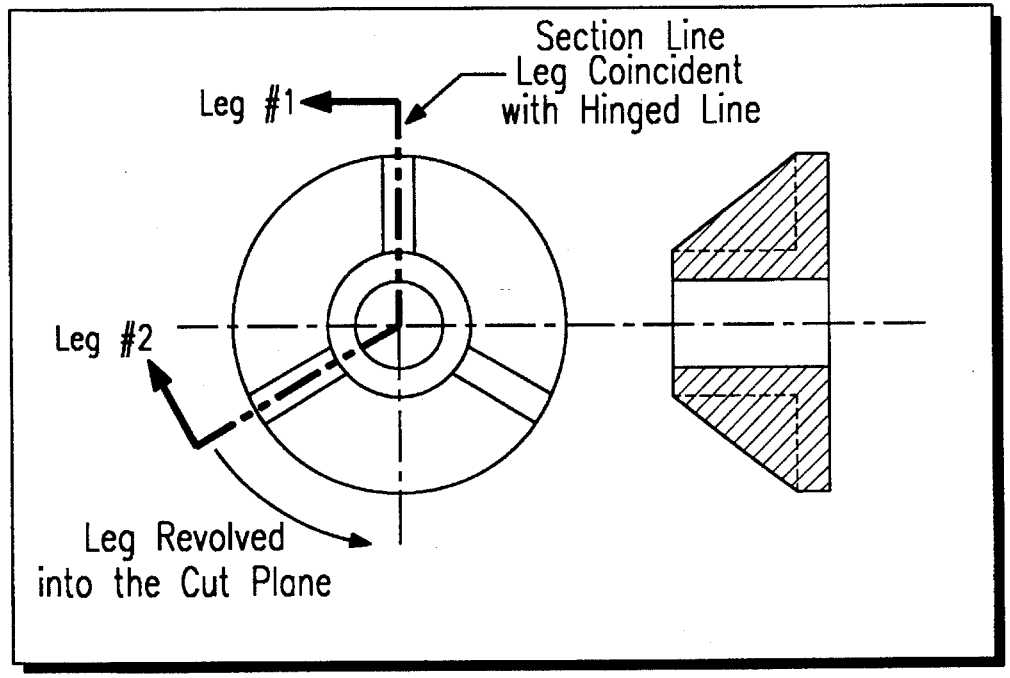
FIG. 6 is a schematic drawing of a section of a model illustrating a simple revolved section view where a section line leg is coincident with the hinge line.

A revolved section is a section view which is revolved about a cylindrical axis. FIG. 6 is a schematic drawing of a section of a model illustrating a simple revolved section view where a section line leg is coincident with the hinge line. Revolved sections normally contain only one revolved cut plane, however there are circumstances where revolving and stepping are combined to form multiple cut planes. All cut planes, including steps, are revolved into a common plane. Note that any bend segments for a revolved section are created in the form of arcs. When creating a revolved section a user specifies a rotation point. This point identifies an axis that the section will be revolved about. FIG. 6 illustrates a rotation point at the arc center of the shown revolved section. In creating the section view Leg #2 will revolve about the rotation point into the cut plane as defined by Leg #1.

Figure 7:
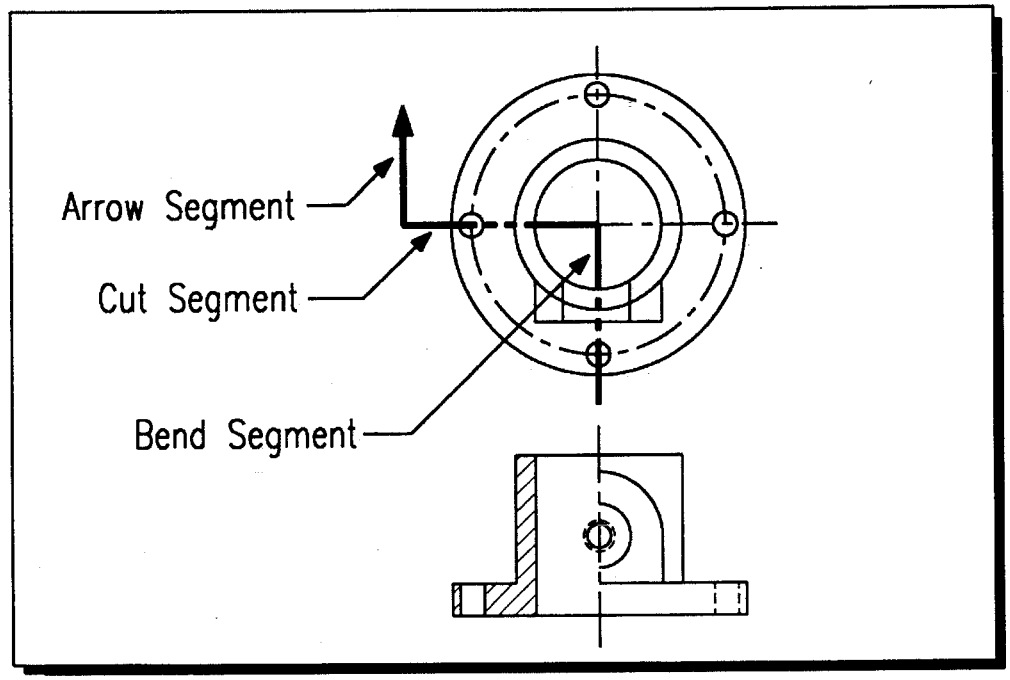
FIG. 7 is a schematic drawing of a section of a model illustrating a half section view.

A half section is a section view with half of the part sectioned and half un-sectioned. FIG. 7 is a schematic drawing of a section of a model illustrating a half section view with bend, cut and arrow segments.

Because the system and method of the present invention is most apparent at two different times in the drafting process, creation of a section and updating of the section, these areas will be discussed separately. Nevertheless, it will become apparent that the areas are very much interrelated.

Creation of Solid Section

Figure 8:
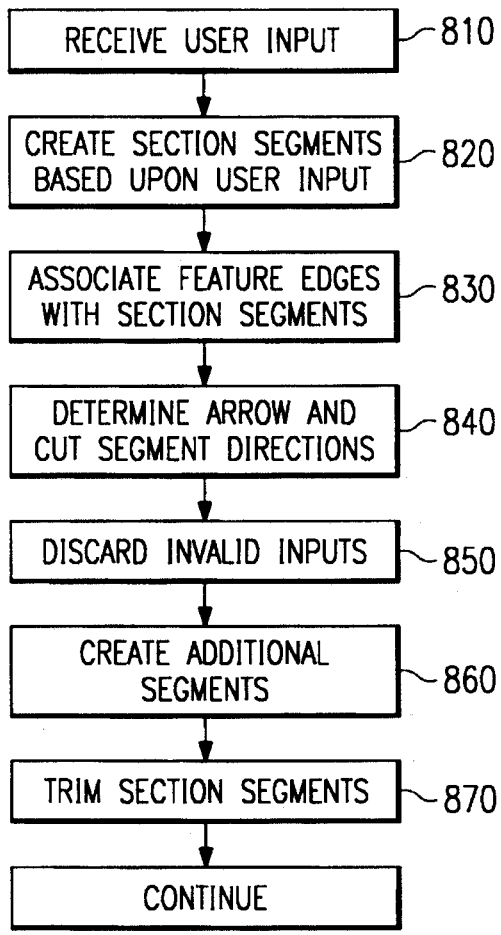
FIG. 8 is a schematic flowchart illustrating the creation of a section line according to the present invention.

FIG. 8 is a schematic flowchart illustrating the creation of a section line according to the present invention. At Block 810 the user specifies what type of section view he wants, indicating hinge line and viewing direction, as well as the features (point(s) on the model) he wants the cut segment to go through. Each time he specifies the desired location of one of those cut segments, thereby automatically designating a particular solid edge, the system generates a drafting point referencing the solid edge and a section segment therefrom (Block 820). The system then associates (links) the selected edges of feature(s) with the relevant section segment(s) (Block 830). This means the system links the drafting point to the solid edge and creates a curve that goes through the drafting point. For a linear section (simple, stepped and half sections), the curve created is a line parallel to the hinge line; for a revolved section, the curve created is a line that goes through the drafting point and the rotation point. This action creates a data structure (drafting point) that references an edge of the model to which it corresponds. The system then creates a section segment entity and generates a curve for that section segment that goes through the drafting point. When the user is done specifying his cut segment(s), the system automatically generates a section line.

The arrow direction and cut direction are determined by the system based on the user's input (Block 840). It then discards invalid inputs (Block 850) and creates additional segments (bend and arrow segments) (Block 860) by sorting the segments along the cut direction and then ensures the types of segments occur in the proper order. For example, the system makes certain there are arrows at each end of the section line; if an arrow is missing the system automatically adds one. The system checks whether there is a bend segment between every two cut segments, and if not, it adds one mid-way between the drafting points of the two cut segments. Moreover, if there are two or more bend segments without a cut segment between them, it discards the extras. At Block 870 the section segments are trimmed to each other (i.e., the section line is drawn).

Moreover, when a section line is first created, the system associates the section line with user-selected feature(s) and if the feature(s) ever change, the section line track the feature(s) and always reflects how the changed details look when displaying the section.

Figure 9:
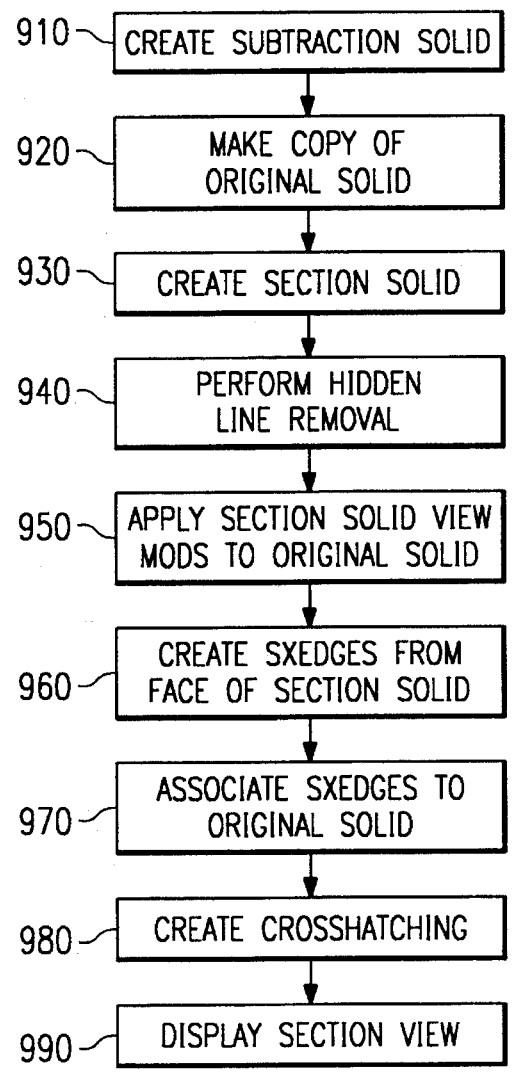
FIG. 9 is a schematic flowchart illustrating the creation of a section view according to the present invention.

FIG. 9 is a schematic flowchart illustrating the creation of a section view according to the present invention. The system initially creates a section view entity based on the newest section line information and at Block 910 it generates a subtraction solid from the section line. The system accomplishes this by extending the section line to the bounding box of the solid to form a closed planar loop. The planar loop is then swept normal to the plane of the loop to form a solid (i.e., the subtraction solid) that extends to the extremities of the box.

Next the system makes a copy of the original solid (Block 920). Such copy inherits face references of the original solid. This copy is preferably maintained only while the section face and edges are used to sort loops and create boundaries for crosshatching.

The subtraction solid is subtracted from the copy of the original solid to create the section solid (Block 930). Hidden line removal is performed on the section solid to produce view modifications on the edges of the section solid (Block 940). Next the section solid hidden line view modifications are applied to the original solid (Block 950).

By way of explanation, a user looks at a computer generated drawing of a model through a view. A view shows the model in different orientations and it can have view mods on it. A view modification (view mod) is a record which reflects various changes the user requests to aid in viewing the drawing. A number of view modifications can be made. For example, a view modification might include changing the color, the font or the visibility or the thickness of the curves drawn to show the model. View modification records are used to indicate whether a given solid edge is visible, invisible or partially visible in a given view. A view mod might also reflect a selected line as drawn as a dashed line, rather than solid, or other desired modifications to the curves. The system matches the edges on the section solid with the edges on the original solid and, using this matching, the view modifications on the section solid are applied to the original solid.

Section edges are created using the faces of the section solid (Block 960). The result of subtracting the subtraction solid from the copied solid modifies the copied solid so that it becomes the section solid. Some of the section solid's faces are new. The system cycles through and finds the boundaries of the new faces and uses them to create section edges. A section edge is created for each edge of those new faces and a curve entity is also created for each edge and which curve is linked to the section edge. For each section edge the system finds the adjoining face as well as its face reference and links the new section edge to that face reference.

There is a face reference for each face of each feature. For each face on a solid there are references to the original feature faces from which a given solid face is derived. As a face is modified, a face reference tracks the original face, any faces separated from the original face as a result of the modification, and any faces merged into the original face as a result of the modification. Thus, if a face splits during a modeling operation, its pieces each inherit its face reference while if faces merge, the resulting face inherits the face references of all of the original faces. Therefore since the face reference of the section solid was inherited from the original solid, the section edge is automatically associated with the face reference of the original solid (Block 970).

At Block 980 crosshatching is created using the section edges as boundaries. The system associates these crosshatch entities to the boundaries. Each boundary is further associated to its section edge curves in loop order (the order the system went around the face). The section entity is then created and associated to the crosshatch, the section line and the original solid. Lastly, the system displays the resulting section view (Block 990).

It should be realized that before the present invention, with previous systems, the user was required to specify everything about the entire section line. This meant the user was required to specify arrow segments and their length, orientation, and location, specify the endpoints of each segment correctly, specify bend segments and their location, length and orientation, specify cut segments and their location, length and orientation, in addition to the type of section view desired, what feature to go through, etc., all without the benefit of system assistance. With the present system, on the other hand, all the user need provide is hinge line, arrow direction and what features the user wants the section line to go through, and the present system automatically creates the section line and the section view therefrom. This results in considerably less work for a user to create a section line (and a section view).

Figure 10:
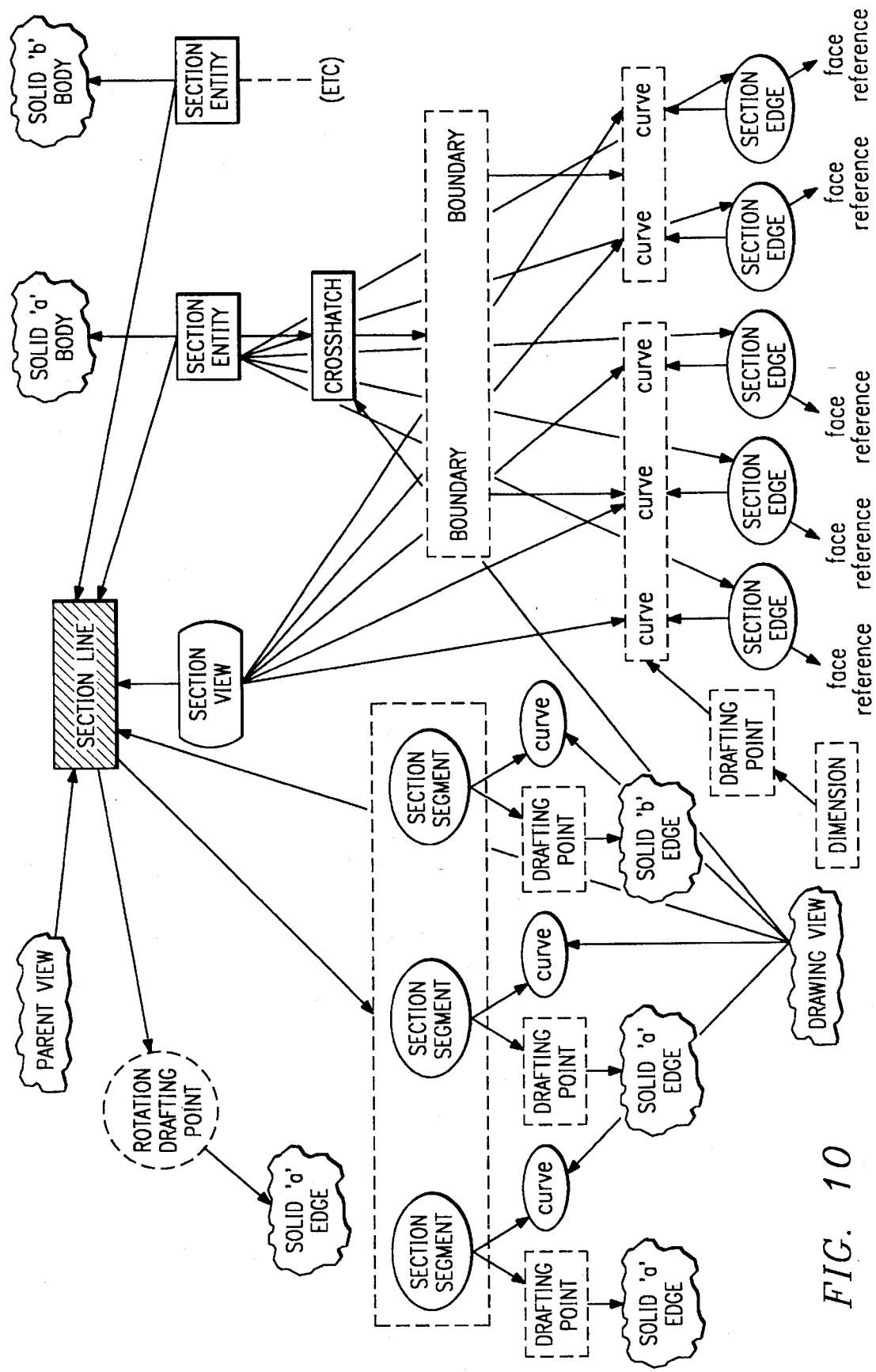
FIG. 10 is a schematic drawing of a preferred representation of links and relationships between various drafting and modeling entities of the present invention.

Because the present system creates associative section views with dimensions associative to their respective section edges, when the model changes, the affected section view automatically updates and the associated dimensions update so the user does not have to do anything additional. The system creates a section that is associated with user-selected features. Specifically, FIG. 10 is a schematic drawing illustrating a preferred representation of links and relationships among entities in the database, according to the present invention. These links and relationships are set up during section creation. Everything about these entities are stored in packets associated with the various entities. For example, if a user pulls up a particular entity, the entity has with it a packet of information that will tell to what it is associated in one direction and to what it is associated in the other direction. So if an entity up line from it is changed in some fashion—moved, added, removed—the associated entities below it are changed accordingly.

The relationships illustrated in FIG. 10 enables the present system to remember how these various entities are created. If the system ever detects that they have to be regenerated (updated), the system knows how it was done the first time, so it can automatically be redone without the user respecifying any of the details. For example, if section line was created through a feature, or the system is dimensioning to a certain section edge, these relationships are remembered because the system has linked them together and stored the particular information in the database with the entities. As noted earlier, while the present example uses "features", it should be understood that the system could also employ attributes instead.

It should be understood that while FIG. 10 depicts arrows going in only one direction among the various entities, this is only the forward direction of association between the particular entities. The arrows could also be going in the opposite direction, thereby depicting the backward direction of association. Only the forward direction is shown for ease of understanding.

By way of explanation, a section segment in FIG. 10 can be arrow segments, cut (or "step") segments, or bend segments. A "curve" is linked to a geometric entity because a section segment has no geometry of its own, it only manages the piece of curve associated with it. Dotted lines around certain groups of entities (e.g., three section segments, two boundaries) reflects a grouping of related entities that together, rather than individually, affect the entity above them. For example, a section line is preferably at least three section segments (two arrow segments and a cut segment—a simple section), while the crosshatch is defined by one or more boundaries. Thus, though a section line can point to a number of section segments, each section segment preferably points to only one curve and one drafting point, and each section edge points to only one face reference.

Updating Section When Solid Changes

The system updates affected associated entities after any geometry of the model has been changed. It does this by updating them in a specified order. (See also FIG. 10.) Geometry for purposes of this discussion includes both features and local geometry or boundary representation geometry. For example, a section line regeneration is done after the regeneration of the section segments but before the dimensions because it retrims the section segments to which the dimensions are associated.

There are two occasions when updating occurs with the present system when the model changes and when the section line is edited. When the former occurs, if the section line goes through a changed or deleted feature, the section line is automatically updated. The associated section view is then updated. However, if the model changes and if the features the section line is associated to do not change, then only the section view is updated. As can be seen, the affected section views are updated for any solids that are changed.

Thus, when the drawing is brought up, the system cycles through all section entities and checks their section validity record to see whether any are out-of-date. If so, the system then updates the section view by removing all view mods from the solid and creating new section edges, view mods and cross-hatching. It should be understood that the system preferably only regenerates sections for solids that have changed not for all solids to thereby decrease processing time and resources. Dimensions attached to old section edges are then reattached to corresponding new section edges and the old section edges and cross-hatching deleted. Reassociating the dimensions is further described below.

Figure 11A:
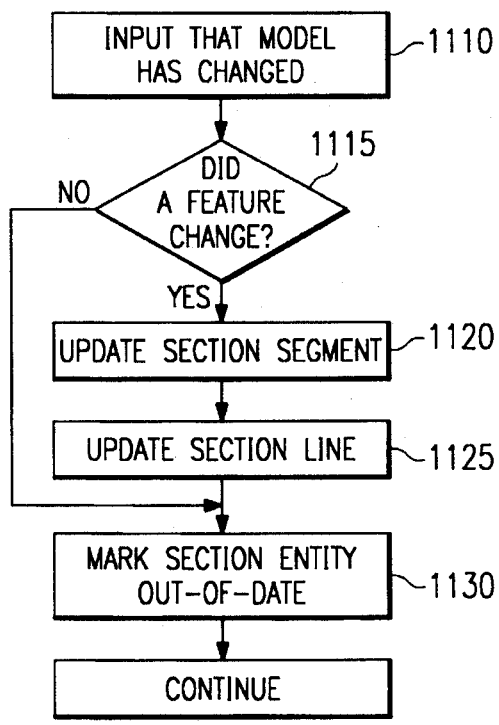
FIGS. 11a–b are schematic flowcharts illustrating the update of a section according to the present invention.
Figure 11B:
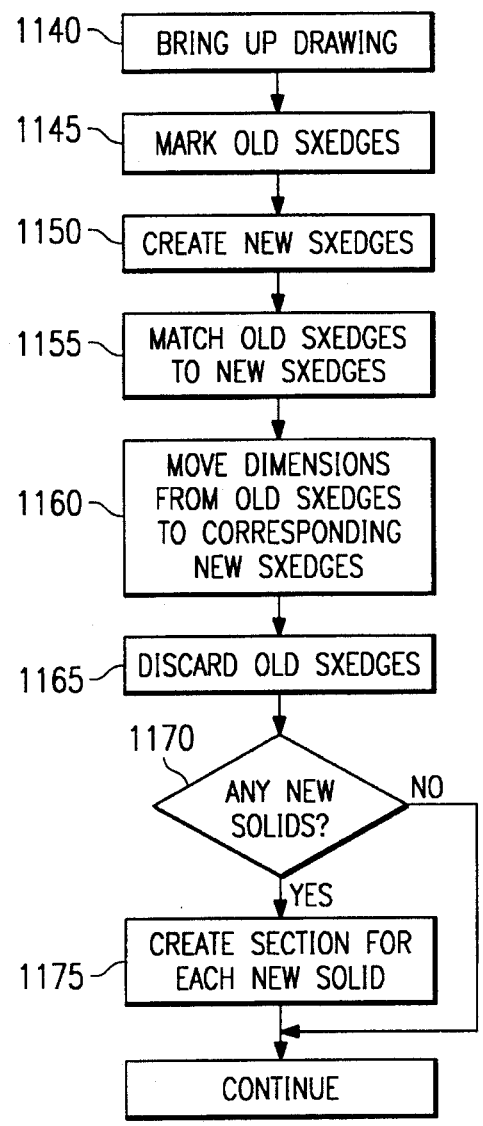

FIGS. 11a–b are schematic flowcharts illustrating the update of a section according to the present invention. Specifically, when the solid model changes (Block 1110) and at least one feature that the section line goes through is affected by such change (Decision block 1115), the system changes the solid edge of the particular feature. This action triggers the drafting point to get updated which in turn forces the system to update the respective section segment (Block 1120). The system updates the section segment by editing the segment's associated curve to go through the new location of the drafting point. As discussed below, a change to a section segment requires the system to then update the section line (Block 1125). Therefore the system updates the section line by retrimming all of the curves of the section segments to their neighboring segments.

It should be noted that when a solid model is edited, the system of the present invention preferably promptly regenerates any section segments associated with drafting points on modified edges, regenerates and redisplays the section line, and marks the section entit(ies) associated with the edited solid as "out-of-date" for later reference (Block 1130). The rest of the cross-section (section view, section edges, cross-hatching) preferably remains out-of-date, to be regenerated only when the user brings up the drawing. It is not desirable to update the section view immediately whenever a solid is edited, because this significantly slows down the modeling process. Instead, by limiting the amount of updating done immediately at model editing time, and by preferably only fully updating the cross-section when necessary in the drafting mode the present system yields significant savings in processing speed and thereby increases performance.

When the solid body (model) is changed, that triggers the present invention to mark the affected section entity out-of-date. Then, at Block 1140, when the drawing is later retrieved during drafting, the section entity updates. The system updates the section entity by updating the section edges and reassociating the dimensions by performing the following steps. Dimensions as used throughout may be various drafting entities associated with curves seen on the drawing such as dimensions, labels (notes with associated arrows), identification symbols, GD&T symbols (geometric, dimensional and tolerancing), centerlines, and the like. A section edge is sometimes referred to herein as a sxedge.

STEP 1: MARK OLD SXEDGES AS OUT-OF-DATE (Block 1145)

This step enables the system to be able to differentiate between old and new sxedges.

STEP 2: CREATE NEW SXEDGES (Block 1150)

Resection the solid model using the updated section line to create new section edges described previously in connection with the creation aspect of the present invention.

A face reference tag of the underlying solid face will be stored as a record on each section edge entity, to be used for matching old and new section edges. A section edge may have no face references. For example, if that section edge is the intersection of two cut plane faces, it will not lie on the surface of the solid and will therefore have no face reference value.

Figure 12B:
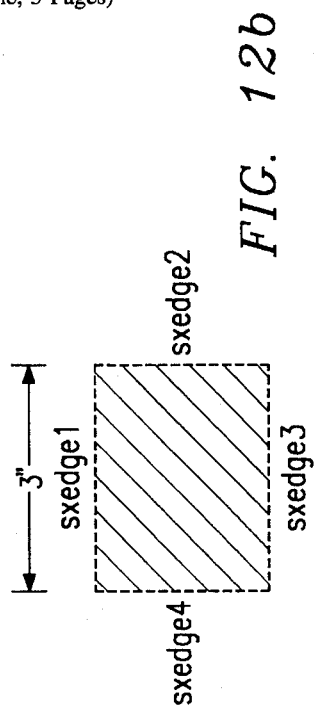
FIGS. 12a–d are schematic drawings of an original and then edited solid with their respective section views according to the present invention.
Figure 12D:
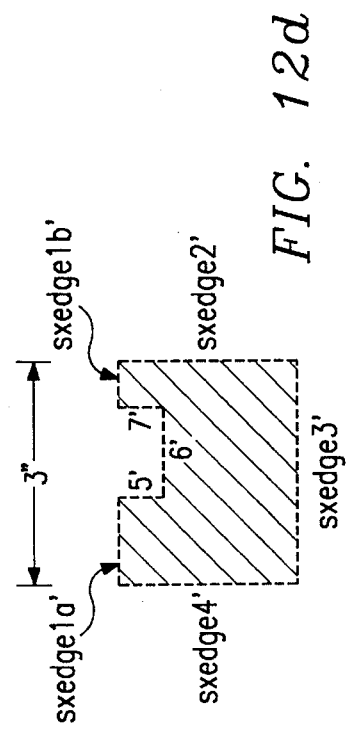
Figure 12A:
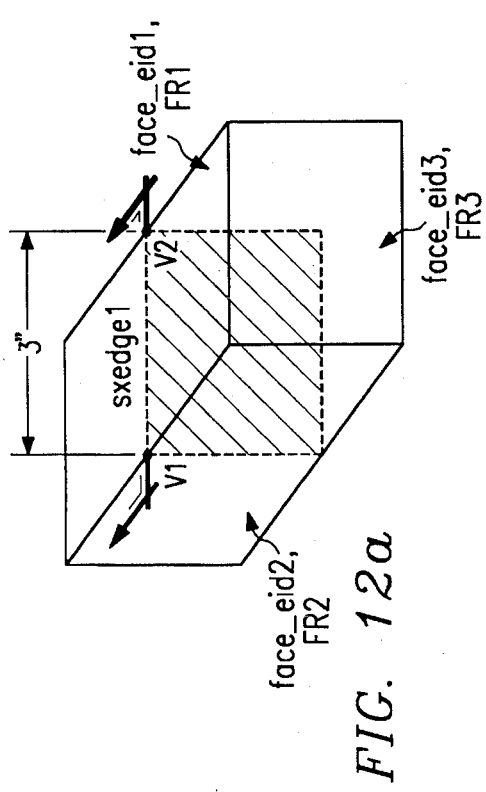
Figure 12C:
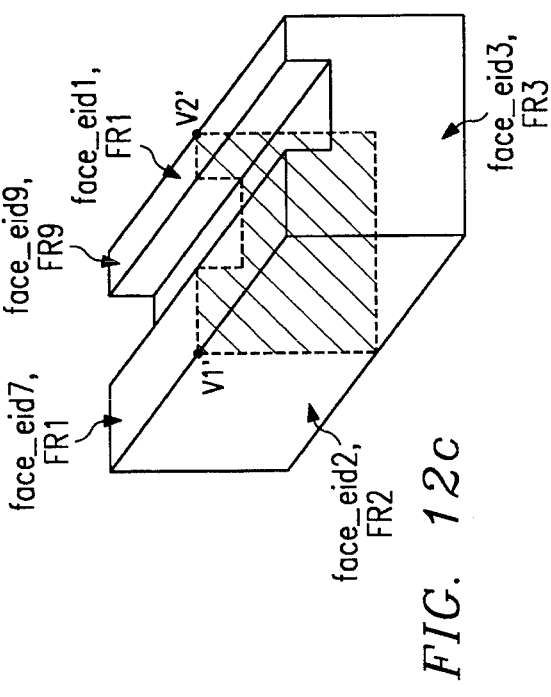

As another example, FIGS. 12a–d schematically illustrates a slot being added to a solid model, including their respective sections views. FIG. 12a shows the original solid while FIG. 12b shows its respective section view. FIG. 12c illustrates the same block, but with a slot bored into the top face, with FIG. 12d schematically representing its respective section view. As can be seen in FIG. 12d, new section edges are sxedge1a', sxedge1b', sxedge2', etc. The face reference for each section edge is the underlying feature face on which the edge lies, for example, the face reference for sxedge1a' is FR1 (FIG. 12a). The face reference for sxedge1b' is also FR1, because it also lies on the original top face of the block, while the face ref for sxedge2' is FR3, etc. There is one cut plane face, the cross-hatched face (seen in FIG. 12c).

STEP 3: CREATE TABLE OF POTENTIAL OLD/NEW SXEDGE MATCHES

This step matches old sxedges to respective new sxedges (Block 1155). The resulting table is used as input to the next step, to salvage dimensions. For each new sxedge, the system obtains all of the face references associated with the corresponding face.

Returning to the example of FIGS. 12a–d, the face reference for each face is the original feature face on which it lies. When the slot is added to the block in (FIG. 12c), the top face (face_eid1) is split into two faces. In this case, one face retains the tag of the original face (face_eid1), and the other gets a new face tag (face_eid7). The face reference for both faces is FR1, because both faces lie on the original top face of the block. For sxedge1a' the face section edge tag is face_eid7. There is only one face reference for that face, FR1, but there can be more (such as if feature faces have been merged).

Then, for each face reference, the system finds all old sxedges which share the face reference. This is accomplished by finding all sxedges associated to the face references (yielding a list of all sxedges that can potentially match our candidate new sxedge), eliminating all sxedges that do not belong to this view, and eliminating any sxedges that are not marked as old (out-of-date), as these are new sxedges.

Finally, the system adds the candidate sxedges corresponding to the old sxedge to a local table preferably in order of old section edge tag. Thus, in the example illustrated by FIGS. 12a–d:

| old sxedge | candidate new sxedge |
|---|---|
| sxedge1 | sxedge1a' |
| sxedge1 | sxedge1b' |
| sxedge4 | sxedge4' |
| sxedge3 | sxedge3' |
| sxedge2 | sxedge2' |

STEP 4: SALVAGE DIMENSIONS OF OLD SXEDGES

This step moves any dimensions associated with old sxedges to corresponding new ones (Block 1160). The system does this by cycling through each unique old sxedge in the table. According to the example illustrated in FIGS. 12a–d, a 3" dimension is originally associated with the ends of sxedge1, namely vertices V1 and V2. When the solid is edited and resectioned, V1 now lies on sxedge1a' and V2 lies on sxedge1b'. The system identifies these new vertices so it can keep the relevant dimension valid by reassociating it with the new entities. By associating a dimension with a vertex (endpoint) of a section edge of such entities for as long as that vertex exists, the system is able to track entities as they move or are repositioned.

Specifically, the present system defines a vertex as the point where a section edge intersects a bounding face. The system finds the proper face by determining which end of the section edge has the desired vertex (i.e., which endpoint has been picked to dimension to) and obtaining the neighboring section edge which shares that endpoint. The face on which this neighboring section edge lies is the bounding face. Thus, for each dimension on a given old sxedge, the system finds all new sxedges that may lie on the same underlying feature face as the old sxedge and checks the endpoints of each candidate new sxedge to find one that ends at the same bounding feature face as the old sxedge did. The system then associates the dimension to the proper sxedge.

Thus, for each dimension of an old sxedge, the system determines which neighbor it is looking for (previous or next). This is accomplished by performing the following:

* If a dimension is associated with the start point of an edge, get its first vertex.
* Else if the dimension is associated with the end point, get the second vertex.
* Find the old sxedge which shares this vertex. This will either be the previous or next sxedge. Call this sxedge "old_neighbor_sxedge". Set "neighbor_type" to either "prev" or "next", depending on which neighbor shares the vertex.
* If the dimension is associated with the center or tangent point of an arc, then just match the sxedge and old_neighbor_sxedge is null.

The system then finds the matching new sxedge that has the vertex that requires dimensioning. A vertex is defined as where an edge meets a bounding face. If the face of the neighbor of new sxedge has the same face reference as the old bounding face, there is a match. The system cycles through the section of the table that holds the contiguous entries for the current old sxedge. For each potentially matching new sxedge in the table, the system obtains its proper neighbor (previous or next, depending on "neighbor_type") and calls it "new_neighbor". The system then cycles through the section of the table for old_neighbor_sxedge to see if any of its new sxedges match new_neighbor. If so, it saves the new sxedge in match_list. There can be more than one match, so continue looping through all candidate new sxedges for the current old sxedge.

Returning now to FIGS. 12a–d, it can be seen that vertex V1 is shared between sxedge1 and sxedge4. Since the loop on the cut plane face is peripheral and counterclockwise, sxedge4 is the "next" edge of sxedge1. So old_neighbor_sxedge=sxedge4, while neighbor_type=next. However, old sxedge1 has two potential new sxedge matches, sxedge1a' and sxedge1b'. The system must find which of these has a "next" neighbor that matches sxedge4. The next edge of sxedge1a' is sxedge4'. The system cycles through the candidate new edges of sxedge4 looking for sxedge4'. It is there, so sxedge1a' gets added to match_list. The next edge of sxedge1b' is sxedge7'. When the system searches the candidate new sxedges of sxedge4 again, sxedge7' is not there, therefore sxedge1b' is not a match for vertex V1.

The system then selects one matching new sxedge. In the present example, the system would select sxedge1a' for vertex V1. On occasion there may be no match, because the face which the old sxedge was on may have been deleted when the solid was edited, or the section line may have been moved so that it no longer intersects the face. The system then reassociates the dimension with the corresponding new sxedge if one exists and continues looping through dimensions on old sxedges until done.

STEP 5: DISCARD OLD SXEDGES (Block 1165)

In this step the system deletes old sxedges as well as associated curves, cross-hatching, and boundaries, but not dimensions. The system then updates the dimensions.

If a model change occasions the update, the system will check for any new solids in a model (Decision block 1170). A new solid is one for which sectioning has not been attempted. Specifically, there is a link (record) between a solid and the drawing. This record is added when the system tries to cut the section through the solid (regardless of success). Then, when the drawing is brought up, the system finds all solids which do not have this record and sections these new solids (Block 1175).

It should be apparent that if the solid model changes and no(ne of the) feature(s) that the section line goes through is affected, then the system only triggers the section entity to mark itself out-of-date. Then when drawing is retrieved in the drafting, the section entity updates as described above (Steps 15).

As mentioned above, the second occasion when updating occurs is when a section line is edited—the user has added, moved, deleted a section segment. To edit a section line a user preferably selects the section line a user wants to edit and indicates a position where the user wants to add, delete or move a segment. The system then updates the associated section view after the desired changes to the section line have been made. The system is able to do this because the section lines and section views are associated when they are originally created. Thus, when a section line is edited the section view automatically updates.

Therefore, if a cut segment is added, the system automatically adds a bend segment. The section line is then updated (regenerated) by the present system which retrims all the segments to each other, including the added segments. If a segment is moved, then the segment gets associated to a new drafting point and the section segment is updated so that its curve goes through the new drafting point. As before, the section line is then updated which retrims all of the segments to each other. If a cut segment gets deleted, the system automatically deletes a bend segment also. Again, the section line then gets updated which retrims the remaining segments to each other.

Because the section line has been updated, the present system automatically updates all associated section entities (Steps 1–5 above).

Thus, with the present system, if the model changes, the section will get regenerated and it will track the user-selected features that the section line is going through. Furthermore, when a section has been updated, dimensions on that section will be updated automatically and they will still be seen on any newly updated section view.

The program listing of the MICROFICHE APPENDIX demonstrates an embodiment of the invention contained therein. It should be understood by those skilled in the art that such is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

We claim:

1. A method for a computerized drafting system to update a section of a model when a feature of said model changes, comprising the computer-performed steps of:

determining that a feature through which a section line crosses has changed, wherein said section line is composed of a plurality of section segments;

adjusting automatically any of said section segments which cross such changed feature to track said changed feature;

regenerating said section line based on said adjusted section segments; and updating said action based on said regenerated section line.

2. The method for a drafting system to update a section of claim 1 wherein said step of updating said section further comprises the step of:

regenerating a section view, as well as any section edges and crosshatching corresponding to said section, accomplishing said regeneration not at model editing time, but when a drawing of said model is brought up.

3. The method for a drafting system to update a section of claim 2 wherein said step of adjusting said section segments is automatically performed upon completion of said step of determining a feature has changed during said model editing time.

4. The method for a drafting system to update a section of claim 1 wherein said step of updating said section further comprises the steps of:

marking old section edges as out-of-date;

cutting a new section using said regenerated section line thereby generating new section edges;

matching said old section edges to new said section edges;

moving and updating dimensions associated with said old section edges to corresponding new section edges; and deleting said old section edges.

5. The method for a drafting system to update a section of claim 4 wherein said step of deleting said old section edges further includes the step of deleting boundaries, curves and crosshatching, but not dimensions.

6. The method for a drafting system to update a section of claim 4 wherein said step of matching said old section edges further comprises the steps of:

finding all new section edges that lie on a same underlying feature face as said old section edges; and checking each candidate new section edge endpoints to find one that ends at the same bounding feature face as said old section edge did.

7. The method for a drafting system to update a section of claim 1 after said step of updating said section further comprising the step of checking for new solids and creating a new section for any such new solid found.

8. A method for a computerized drafting system to automatically generate a section view for a model, comprising the computer-performed steps of:

receiving user input, wherein said user input comprises which of at least one feature said user desires associated with a section line;

associating selected edges of said at least one feature with corresponding section segments;

creating additional section segments if necessary;

trimming all of said section segments together to form a section line; and creating a section view based on said associated section line.

9. The method for a drafting system to automatically generate a section view of claim 8, wherein said user input further includes only a hinge line and an arrow direction in addition to said at least one feature.

10. The method for a drafting system to automatically generate a section view of claim 8, wherein said step of creating additional section segments further comprises the steps of:

sorting said section segments along said hinge line direction; and ensuring said section segments occur in proper order.

11. The method for a drafting system to automatically generate a section view of claim 10, after said step of ensuring said section segments occur in proper order, further comprises the step of discarding invalid inputs.

12. The method for a drafting system to automatically generate a section view of claim 8, wherein said step of creating additional section segments includes a step of adding arrow and bend section segments.

13. The method for a drafting system to automatically generate a section view of claim 8, wherein said step of creating a section view further comprises the steps of:

creating a subtraction solid based on said associated section line;

copying said original solid model;

subtracting said subtraction solid from said copy of said solid model to create a section solid;

applying section solid hidden line view modifications to said original solid;

creating section edges using faces of said section solid;

associating said section edges to said original solid; and displaying said section view.

14. The method for a drafting system to automatically generate a section view of claim 13, wherein after said step of subtracting said subtraction solid is a step for performing a hidden line removal on said section solid.

15. The method for a drafting system to automatically generate a section view of claim 13, further comprising the step of creating crosshatching using said section edges as boundary curves.

16. A drafting system for automatically creating a section of a solid model while maintaining correct corresponding dimensions, comprising:

an interactive user interface for receiving user input, wherein said user input comprises which of at least one feature said user desires associated with a section line; and a drawing manager of said drafting system connected to said interactive user interface, for automatically associating selected edges of said at least one feature with corresponding section segments, creating additional section segments if necessary, trimming all of said section segments together to form a section line, associating said section line to said solid model, and creating a section view based on said associated section line.

\* \* \* \* \*